A. E. NICKERSON & L. C. STREETER.
Means for Pumping Wells.
No. 6,486. Reissued June 15, 1875.
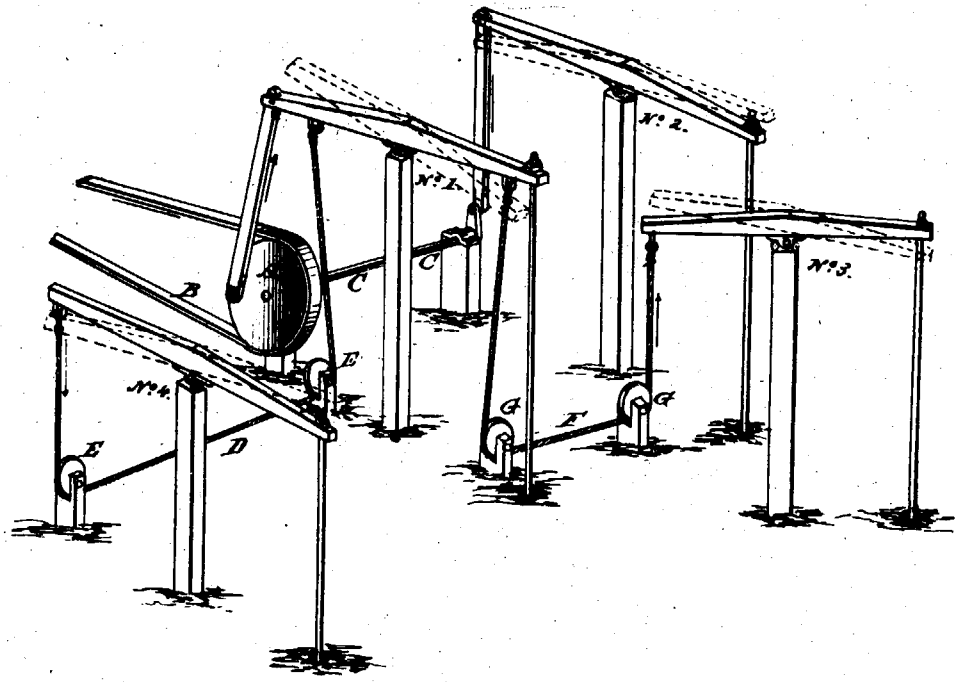
WITNESSES:
P. C. Dieterich.
H. C. McArthur
INVENTORS.
Albert E. Nickerson
Levi C. Streeter
per
C. H. Watson & Co.
ATTORNEYS.

UNITED STATES PATENT OFFICE.

ALBERT E. NICKERSON AND LEVI C. STREETER, OF ALLEGHENY TOWNSHIP, VENANGO COUNTY, PENNSYLVANIA.

IMPROVEMENT IN MEANS FOR PUMPING WELLS.

Specification forming part of Letters Patent No. 162,406, dated April 20, 1875; reissue No. 6,486, dated June 15, 1875; application filed May 31, 1875.

---

*To all whom it may concern:*

Be it known that we, ALBERT E. NICKERSON and LEVI C. STREETER, both of Allegheny township, Venango county, State of Pennsylvania, have invented certain Improvements in the Manner of Pumping and Operating Artesian Wells, of which the following is a specification:

Our invention relates to the method of pumping artesian wells located in proximity to each other.

In pumping oil-wells the power of the engine is most exerted in the lifting or upward stroke of the walking-beam, so that heretofore it has been necessary to have a separate engine for each well, although often several such engines are supplied with steam from the same boiler.

The object of our invention is to enable the pumping of two or more wells with one engine. By it the walking-beams of the different wells are made to move in different directions at the same time, thereby counterbalancing each other and equalizing the strain on the engine.

The annexed drawing represents a cluster of four wells, numbered, respectively, 1, 2, 3, and 4, connected together and operated by one engine.

A is a band-wheel, driven by the belt B from the engine, and driving a shaft, C, said shaft having at each end a crank, the cranks being set opposite each other, one connected with the pitman to the walking-beam of well No. 1, and the other with the pitman to the walking-beam of well No. 2. At the pitman end of the walking-beam of well No. 1 is attached a rope, D, which, passing under the pulleys E E, is connected with the walking-beam of well No. 4. At the opposite or well end of the walking-beam of well No. 1 is attached another rope, F, which, passing under the pulleys G G, is attached to the end of the walking-beam of well No. 3.

By an examination of the drawing, it will be seen that the walking-beam to well No. 1 is lifting or raising fluid from the well. Well No. 3 is also lifting; while at the same time wells 2 and 4 are moving in an opposite direction, or plunging, and vice versa.

The dotted lines in the drawing show the position the several walking-beams will take upon the half-revolution of the wheel A.

For the ropes D and F may be substituted rods of wood or iron, and for the pulleys E E and G G may be substituted rocker-shafts, as may be found most convenient and practicable.

What we claim as our invention is as follows:

1. As a means of pumping two or more wells simultaneously by a single motor, the combination of a wheel, A, or equivalent, and connecting-levers, walking-beams, and ropes or chains, substantially as described, whereby the walking-beams move in different directions from each other, to equalize the strain on the motor, for the purpose set forth.

2. The combination, with the wheel A, operated by a suitable motor, of the crank-shaft C, connected by pitmen with two independent walking-beams, and one of said walking-beams connected by ropes or chains passing around suitable pulleys, with two other independent walking-beams, substantially as and for the purposes herein set forth.

In witness whereof we have hereunto set our hands.

ALBERT E. NICKERSON.
LEVI C. STREETER.

Witnesses:
GEO. H. CHRISTY,
J. E. BOGGS.